US010268073B2

(12) United States Patent
Wu et al.

(10) Patent No.: US 10,268,073 B2
(45) Date of Patent: Apr. 23, 2019

(54) BACKLIGHT, ASSEMBLY METHOD THEREOF AND DISPLAY DEVICE

(71) Applicant: BOE Technology Group Co., Ltd., Beijing (CN)

(72) Inventors: Zhongbao Wu, Beijing (CN); Ruoyu Ma, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 15/563,059

(22) PCT Filed: Feb. 17, 2017

(86) PCT No.: PCT/CN2017/073858
§ 371 (c)(1),
(2) Date: Sep. 29, 2017

(87) PCT Pub. No.: WO2017/197938
PCT Pub. Date: Nov. 23, 2017

(65) Prior Publication Data
US 2018/0196311 A1 Jul. 12, 2018

(30) Foreign Application Priority Data
May 17, 2016 (CN) .......................... 2016 1 0326436

(51) Int. Cl.
F21V 8/00 (2006.01)
G02F 1/1335 (2006.01)

(52) U.S. Cl.
CPC ...... G02F 1/133603 (2013.01); G02B 6/0011 (2013.01); G02B 6/0026 (2013.01);
(Continued)

(58) Field of Classification Search
CPC ..... G02B 6/0026; G02B 6/0091; G02B 6/009
(Continued)

(56) References Cited

U.S. PATENT DOCUMENTS 9,588,282 B2 * 3/2017 Li .................... G02B 6/0088
2013/0021790 A1 1/2013 Hsu et al.
(Continued)

FOREIGN PATENT DOCUMENTS

CN 102798038 A 11/2012
CN 102889489 A 1/2013
(Continued)

OTHER PUBLICATIONS

May 22, 2018—(CN) First Office Action Appn 201610326436.9 with English Translation.
(Continued)

Primary Examiner — William N Harris
(74) Attorney, Agent, or Firm — Banner & Witcoff, Ltd.

(57) ABSTRACT

A backlight, an assembly method thereof and a display device are disclosed. The backlight includes a light source configured to emit light having a first wavelength; a wavelength converter disposed on a light-emitting side of the light source and configured to convert the light having the first wavelength into light having a second wavelength upon passing through the wavelength converter, in which the second wavelength is different from the first wavelength; and a light guide plate disposed on one side of the wavelength converter away from the light source, and configured to receive and re-emit the light emitted from the wavelength converter.

17 Claims, 5 Drawing Sheets

(52) U.S. Cl.
CPC ..... *G02B 6/0081* (2013.01); *G02F 1/133606* (2013.01); *G02F 1/133615* (2013.01); *G02F 2001/133607* (2013.01); *G02F 2001/133614* (2013.01)

(58) Field of Classification Search
USPC ........................................................ 362/608
See application file for complete search history.

(56) References Cited

U.S. PATENT DOCUMENTS

| | | | |
|---|---|---|---|
| 2013/0271700 A1* | 10/2013 | Nakamura | G02B 6/0026 349/65 |
| 2013/0329161 A1 | 12/2013 | Park et al. | |
| 2013/0336003 A1 | 12/2013 | Yang et al. | |
| 2014/0240644 A1* | 8/2014 | Abe | G02B 6/0088 349/71 |
| 2015/0103291 A1* | 4/2015 | Li | G02B 6/0023 349/62 |
| 2015/0212260 A1 | 7/2015 | Li | |
| 2015/0219822 A1* | 8/2015 | Lee | G02B 6/0023 362/608 |
| 2015/0226904 A1* | 8/2015 | Bae | G02B 6/0023 362/608 |
| 2015/0234111 A1 | 8/2015 | Lee et al. | |
| 2015/0260906 A1* | 9/2015 | Li | G02B 6/0088 362/608 |
| 2015/0293292 A1* | 10/2015 | Lee | G02B 6/0026 362/608 |
| 2015/0338064 A1* | 11/2015 | Ishino | G02F 1/133615 349/61 |
| 2015/0355400 A1* | 12/2015 | Li | G02F 1/133608 349/62 |
| 2015/0362654 A1* | 12/2015 | Sadasivan | G02B 6/009 362/609 |
| 2016/0266299 A1* | 9/2016 | Yoon | G02B 6/00 |
| 2016/0327732 A1* | 11/2016 | Chen | G02B 6/0055 |
| 2017/0003442 A1* | 1/2017 | Chen | G02B 6/0088 |
| 2017/0097463 A1* | 4/2017 | Chen | G02B 6/0055 |
| 2017/0102494 A1* | 4/2017 | Que | G02B 6/0026 |

FOREIGN PATENT DOCUMENTS

| | | |
|---|---|---|
| CN | 103487990 A | 1/2014 |
| CN | 103885243 A | 6/2014 |
| CN | 104503135 A | 4/2015 |
| CN | 205210481 U | 5/2016 |

OTHER PUBLICATIONS

May 24, 2017—(WO) International Search Report and Written Opinion Appn PCT/CN2017/073858 with English Tran.

* cited by examiner

BACKLIGHT, ASSEMBLY METHOD THEREOF AND DISPLAY DEVICE

The application is a U.S. National Phase Entry of International Application No. PCT/CN2017/073858 filed on Feb. 17, 2017, designating the United States of America and claiming priority to Chinese Patent Application No. 201610326436.9 filed on May 17, 2016. The present application claims priority to and the benefit of the above-identified applications and the above-identified applications are incorporated by reference herein in their entirety.

TECHNICAL FIELD

Embodiments of the present disclosure relate to a backlight, an assembly method thereof and a display device.

BACKGROUND

Liquid crystal display (LCD) device is a currently widely used display device and generally includes a display panel and a backlight for bearing the display panel and providing backlight for the display panel. In the existing LCD device, a wavelength of light emitted by the backlight basically has been determined when produced by backlight manufacturers. However, with the increased requirements on the display effect of the LCD device, an improvement in the color gamut of the LCD device has become the trends of future technical development.

SUMMARY

Embodiments of the present disclosure provide a backlight, an assembly method thereof and a display device to increase the color gamut of the display device.

At least one embodiment of the present disclosure provides a backlight, including: a light source configured to emit light having a first wavelength; a wavelength converter disposed on a light-emitting side of the light source and configured to convert the light having the first wavelength into light having a second wavelength upon passing through the wavelength converter, the second wavelength being different from the first wavelength; and a light guide plate (LGP) disposed on one side of the wavelength converter away from the light source, and configured to receive and re-emit the light emitted from the wavelength converter.

For example, the LGP includes a light-emitting surface and a reflecting surface opposite to each other, and further includes a light-incident surface connecting the light-emitting surface and the reflecting surface; and the wavelength converter is disposed between the light source and the light-incident surface of the LGP.

For example, the wavelength converter includes: a wavelength conversion component configured to convert the light having the first wavelength into the light having the second wavelength; and a fixing component including a side wall for providing an accommodating space, wherein the wavelength conversion component is disposed in the accommodating space of the fixing component.

For example, the side wall of the fixing component includes a first protrusion and a second protrusion which are protruded towards the wavelength conversion component; and the wavelength conversion component is disposed between the first protrusion and the second protrusion.

For example, the side wall of the fixing component further includes a third protrusion protruded towards the wavelength conversion component; the first protrusion, the second protrusion and the third protrusion are all disposed on a first side of the wavelength conversion component; and the third protrusion is disposed between the first protrusion and the second protrusion.

For example, the side wall of the fixing component further includes a fourth protrusion and a fifth protrusion which are protruded towards the wavelength conversion component; the fourth protrusion and the fifth protrusion are disposed on a second side of the wavelength conversion component; and the second side of the wavelength conversion component is opposite to the first side of the wavelength conversion component.

For example, the side wall of the fixing component forms a reflection cavity located between the light source and the wavelength conversion component; and the side wall of the fixing component is provided with a reflecting surface at the reflection cavity.

For example, the reflecting surface is inclined relative to the light-emitting side of the light source.

For example, in a direction from the reflection cavity to the accommodating space, an aperture of the reflection cavity is gradually increased.

For example, an opening is formed on an end portion of the fixing component; and the light source is disposed at the opening.

For example, the side wall of the fixing component includes a first housing and a second housing opposite to each other, so as to form the accommodating space.

For example, the wavelength conversion component includes a luminescent material.

For example, the backlight further includes a heat sink, wherein the heat sink includes a baffle and a bearing board connected with the baffle; an accommodating space is formed between the baffle and the bearing board; and the light source, the wavelength converter and the LGP are disposed in the accommodating space of the cooling pad.

For example, the bearing board of the heat sink includes a lug boss protruded towards the LGP; and the lug boss is disposed on one side of the wavelength converter away from the light source, so as to limit a position of the wavelength converter.

For example, the backlight further includes a rubber frame, wherein the rubber frame includes a baffle and a positioning structure connected with the baffle; an accommodating space is formed between the baffle and the positioning structure; and the light source and the wavelength converter are disposed in the accommodating space of the rubber frame.

For example, the positioning structure of the rubber frame is provided with a projection; and the projection is disposed on one side of the wavelength converter away from the light source, so as to limit a position of the wavelength converter.

At least one embodiment of the present disclosure further provides a display device including any of the above-mentioned backlights.

At least one embodiment of the present disclosure further provides an assembly method of a backlight, including: arranging a wavelength converter on a light-emitting side of a light source, the wavelength converter being configured to convert light having a first wavelength into light having a second wavelength upon the light passing through the wavelength converter, and the second wavelength being different from the first wavelength; and arranging a light guide plate (LGP) on one side of the wavelength converter away from the light source so that the LGP is disposed within an irradiation range of light emitted from the wavelength converter.

For example, the wavelength converter includes a fixing component and a wavelength conversion component; the fixing component includes a first housing and a second housing which are arranged opposite to each other to form an accommodating space. The assembly method of the wavelength converter includes: applying opposite acting forces to end portions of the first housing and the second housing in the fixing component of the wavelength converter, respectively, so as to form a gap between the first housing and the second housing; and placing the wavelength conversion component in the accommodating space through the gap.

For example, the assembly method further includes: placing a rubber frame on the light source, the wavelength converter and the LGP so as to fix relative positions of the light source, the wavelength converter and the LGP.

BRIEF DESCRIPTION OF THE DRAWINGS

Hereafter, the embodiments of the present disclosure will be described in a more detailed way with reference to the accompanying drawings, so as make one person skilled in the art be able to understand the present disclosure more clearly, wherein.

REFERENCE NUMERALS

10—light source; 11—luminescent element; 12—circuit board; 20—wavelength converter; 21—fixing component; 219a—first extension; 219b—second extension; 211—first housing; 212—second housing; 218—connecting part; 218a—positioning hole; 22—wavelength conversion component; 210a—first protrusion; 210b—second protrusion; 213—accommodating space of fixing component; 210c—third protrusion; 210d—fourth protrusion; 210e—fifth protrusion; 210—side wall; 214—reflection cavity; 215—M—shaped structure; 30—LGP; 40—heat sink; 41, 51—baffle; 42—bearing board; 43—accommodating space of heat sink; 53—accommodating space of rubber frame; 44—lug boss; 45, 46—connecting piece; 50—rubber frame; 52—positioning structure; 54—projection; 61—display panel; 62—optical membrane; 63—reflector plate; 64—backplane; 65—front frame.

DETAILED DESCRIPTION

Hereafter, the technical solutions in the embodiments of the present disclosure will be described in a clearly and fully understandable way in connection with the drawings in the embodiments of the present disclosure. It is obvious that the described embodiments are just a part but not all of the embodiments of the disclosure. Based on the described embodiments herein, one person skilled in the art can obtain other embodiment(s), without any inventive work, which should be within the scope of the disclosure.

Unless otherwise defined, the technical terminology or scientific terminology used herein should have the same meaning as commonly understood by one of ordinary skill in the art to which this invention belongs. Likewise, terms like "first," "second," etc., which are used in the description and the claims of the present application for invention, are not intended to indicate any sequence, amount or importance, but distinguish various components. The phrases "connect", "connected", etc., are not intended to define a physical connection or mechanical connection, but may include an electrical connection, directly or indirectly. "On," "under," "left," "right" or the like is only used to describe a relative positional relationship, and when the absolute position of a described object is changed, the relative positional relationship might also be changed accordingly.

Embodiments of the present disclosure provide a backlight, an assembly method thereof and a display device. A wavelength converter is disposed between a light source and an LGP of the backlight, and the wavelength converter can convert a wavelength of light emitted by the light source, so that the color gamut of the display device can be increased.

Figure 1:
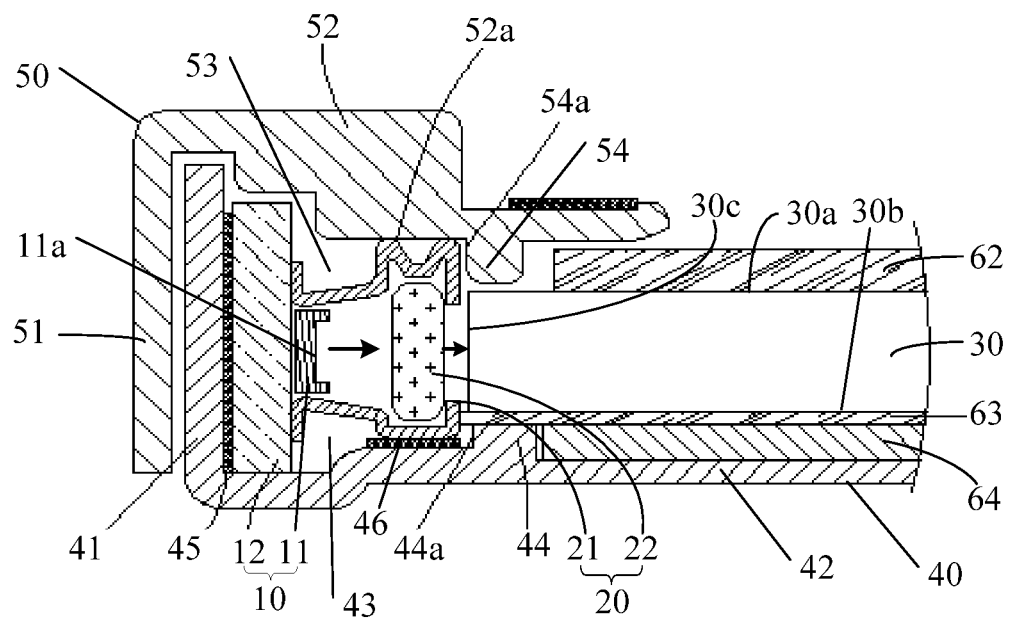
FIG. 1 is a schematic partial sectional view of a backlight provided by an embodiment of the present disclosure.

As illustrated in FIG. 1, at least one embodiment of the present disclosure provides a backlight including a light source 10, a wavelength converter 20 and an LGP 30. The light source 10 is configured to emit light with a first wavelength (as illustrated by an arrow on the left in FIG. 1); the wavelength converter 20 is disposed on a light-emitting side of the light source 10 (namely one side of a light-emitting surface 11a of the light source 10 closer to the LGP 300) and configured to convert the light with the first wavelength into light with a second wavelength (as illustrated by an arrow on the right in FIG. 1) after passing through the wavelength converter 20, and the second wavelength is different from the first wavelength; and the LGP 30 is disposed on one side of the wavelength converter 20 away from the light source 10 and is configured to receive light emitted from the wavelength converter 20 and re-emit the light.

It should be noted that the light with the first wavelength and the light with the second wavelength may both be light with a single wavelength, and may also be light with specific wavelength range. When both the light with the first wavelength and the light with the second wavelength are light with specific wavelength range, partial wavelength range or the entire wavelength range of the light with the first wavelength may be converted by the wavelength converter 20 to obtain the light with the second wavelength. The light emitted from the wavelength converter 20 may be the light with the second wavelength, and may also be light obtained by processing the light with the second wavelength via other optical elements in the wavelength converter. In addition, the arrows in FIG. 1 are only used for illustratively representing the light with the first wavelength and the light with the second wavelength.

For instance, the backlight provided by at least one embodiment of the present disclosure may be an edge-lit backlight. That is to say, the LGP 30 includes a light-emitting surface 30a and a reflecting surface 30b opposite to each other, and further includes a light-incident surface 30c for connecting the light-emitting surface 30a and the reflecting surface 30b; and the wavelength converter 20 may be disposed between the light source 10 and the light-incident surface 30c of the LGP 30. In this case, the light emitted from the wavelength converter 20 may be incident into the LGP 30 through the light-incident surface 30c of the LGP 30, and then emitted through the light-emitting surface 30a of the LGP 30 and enter a display panel included in the display device. Use of the edge-lit backlight can simplify the structure of the backlight and provide convenience for the assembly of the wavelength converter 20.

For instance, the backlight provided by at least one embodiment of the present disclosure may further include a heat sink 40. The heat sink 40 may include a baffle 41 and a bearing board 42 connected with the baffle 41; an accommodating space 43 is formed between the baffle 41 and the bearing board 42; and the light source 10, the wavelength converter 20 and the LGP 30 may be disposed in the accommodating space 43 of the heat sink 40.

For instance, the bearing board 42 of the heat sink 40 may include a lug boss 44 protruded towards the LGP 30; and the lug boss 44 is disposed on one side of the wavelength converter 20 away from the light source 10, so as to limit a position of the wavelength converter 20. As illustrated in FIG. 1, the lug boss 44 includes a side surface 44a facing the wavelength converter 20, so that the lug boss 44 can function for preventing the wavelength converter 20 from moving towards the LGP 30; in this way, the mechanical performance of the backlight can be improved.

For instance, the backlight provided by at least one embodiment of the present disclosure may further include a rubber frame 50. The rubber frame 50 may include a baffle 51 and a positioning mechanism 52 connected with the baffle 51; an accommodating space 53 is formed between the baffle 51 and the positioning structure 52; and the light source 10 and the wavelength converter 20 are disposed in the accommodating space 53 of the rubber frame 50.

For instance, the positioning structure 52 of the rubber frame 50 may be provided with a projection 54. The projection 54 is disposed on one side of the wavelength converter 20 away from the light source 10, so as to limit a position of the wavelength converter 20. As illustrated in FIG. 1, the projection 54 includes a side surface 54a facing the wavelength converter 20, so that the projection 54 can function for preventing the wavelength converter 20 from moving towards the LGP 30; in this way, the mechanical performance of the backlight can be improved.

For instance, a lower surface 52a of the positioning structure 52 of the rubber frame 50 that is facing the wavelength converter 20 may also limit the position of the wavelength converter 20, so as to prevent the wavelength converter 20 from moving in a direction away from the bearing board 42 of the heat sink 40. Thus, the mechanical performance of the backlight can be further improved.

Of course, as illustrated in FIG. 1, the positioning structure 52 of the rubber frame 50 may also be provided with other projections (not illustrated in FIG. 1), so as to limit the position of the light source 10 and/or the baffle 41 of the heat sink 40.

For instance, the light source 10 may include luminescent elements 11 and a circuit board 12 connected with the luminescent elements 11. For instance, the luminescent elements may be light-emitting diode (LED) luminescent elements, organic light-emitting diode (OLED) luminescent elements, etc. For instance, the circuit board 12 may be a printed circuit board (PCB), e.g., a flexible PCB.

For instance, the light source 10 and/or the wavelength converter 20 may be connected with the heat sink 40 so as to improve the mechanical performance of the light source. For instance, as illustrated in FIG. 1, the circuit board 12 of the light source 10 may be connected with the baffle 41 of the heat sink 40 through a connecting piece 45 such as an adhesive (e.g., glue). For instance, the wavelength converter 20 may be connected with the bearing board 42 of the heat sink 40 through a connecting piece 46 such as an adhesive (e.g., glue).

Of course, the backlight may further include: an optical membrane 62 disposed on the LGP 30; and structures such as a reflector plate 63 and a backplane 64 which are disposed between the LGP 30 and the heat sink 40. No further description will be given herein to these structures.

Detailed description will be given below to the wavelength converter 20 with reference to FIGS. 1 to 3c.

Figure 2:
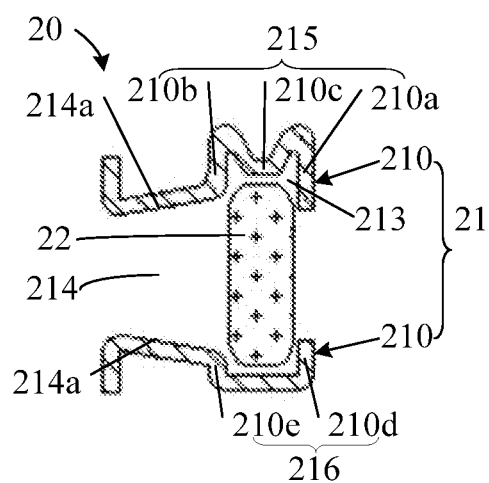
FIG. 2 is a schematic diagram of a wavelength converter in the backlight provided by the embodiment of the present disclosure.

For instance, as illustrated in FIG. 1, the wavelength converter 20 may include a wavelength conversion component 22 and a fixing component 21. The wavelength conversion component 22 is configured to convert the light with the first wavelength into the light with the second wavelength. For instance, the wavelength conversion component 22 may include a luminescent material. The luminescent material may be, for instance, quantum dot or fluorescent agent. For instance, the wavelength conversion component 22 may further include a transparent container for accommodating the luminescent material, e.g., a glass tube. The fixing component 21 of the wavelength converter 20 is used for fixing the wavelength conversion component 22. As illustrated in FIG. 2, the fixing component 21 includes a side wall 210 for providing an accommodating space 213, and the wavelength conversion component 22 is disposed in the accommodating space 213 of the fixing component 21.

For instance, as illustrated in FIG. 2, the side wall 210 of the fixing component 21 may include a first protrusion 210a and a second protrusion 210b which are protruded towards the wavelength conversion component 22. The wavelength conversion component 22 is disposed between the first protrusion 210a and the second protrusion 210b, so that the first protrusion 210a and the second protrusion 210b can fix the wavelength conversion component 22 in the accommodating space 213 of the fixing component 21.

For instance, the side wall 210 of the fixing component 21 may further include a third protrusion 210c protruded towards the wavelength conversion component 22; the first protrusion 210a, the second protrusion 210b and the third protrusion 210c are all disposed on a first side of the wavelength conversion component 22 (as illustrated by the upper side of the wavelength conversion component 22 in FIG. 2); and the third protrusion 210c is disposed between the first protrusion 210a and the second protrusion 210b. Thus, the side wall 210 of the fixing component 21 may form an M-shaped structure 215 through the first, second and third protrusions. The M-shaped structure 215 may fix the wavelength conversion component 22 in the transverse direction and the longitudinal direction. Moreover, the M-shaped structure has high mechanical strength.

For instance, the side wall 210 of the fixing component 21 may further include a fourth protrusion 210d and a fifth protrusion 210e which are protruded towards the wavelength conversion component 22; the fourth protrusion 210d and the fifth protrusion 210e are disposed on a second side of the wavelength conversion component 22 (as illustrated by the lower side of the wavelength conversion component 22 in FIG. 2); and the second side of the wavelength conversion component 22 is opposite to the first side of the wavelength conversion component 22. In this way, the wavelength conversion component 22 may be further fixed by the arrangement of the fourth and fifth protrusions.

For instance, the side wall 210 of the fixing component 21 may also form a reflection cavity 214 located between the light source (not illustrated in FIG. 2) and the wavelength conversion component 22. The side wall 210 of the fixing component 21 is provided with a reflecting surface 214a at the reflection cavity 214. By the arrangement of the reflection cavity 214, the light emitted by the light source may be reflected by the reflecting surface 214a and then enter the wavelength conversion component 22. Thus, the light utilization rate and the light mixing effect can be improved, so that the wavelength converter 20 can have better optical coupling property.

For instance, the reflecting surface 214a may be inclined relative to the light-emitting side (as illustrated by 11a in FIG. 1) of the light source 10. As the light emitted by the light source has multiple, different radiation directions, the inclined arrangement is more favorable for the reflecting surface 214a to reflect the light emitted by the light source. It should be noted that the inclination angle of the reflecting surface 214a may be set according to the luminescent elements of the light source as adopted. No further description will be given herein.

For instance, in a direction from the reflection cavity 214 to the accommodating space 213 of the wavelength conversion component 22 (namely in the direction from the reflection cavity 214 to the wavelength conversion component 22), an aperture of the reflection cavity 214 is gradually increased. Thus, it may be more favorable for the reflecting surface 214a to reflect the light emitted by the light source adopting luminescent elements such as LEDs or OLEDs.

Detailed description will be given below to the fixing component 21 of the wavelength converter 20 with reference to FIGS. 3a to 3c.

Figure 3A:
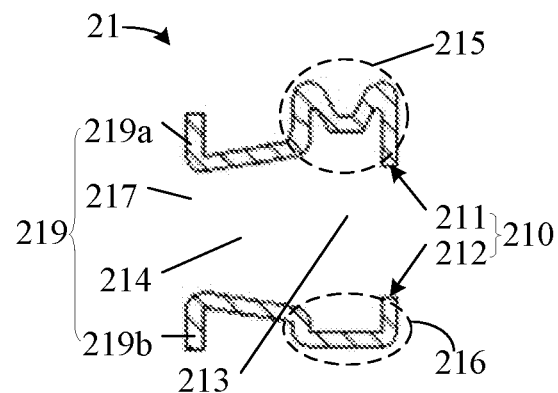
FIGS. 3a and 3b are schematic diagrams of a fixing component in the wavelength converter of the backlight provided by the embodiment of the present disclosure.
Figure 3B:
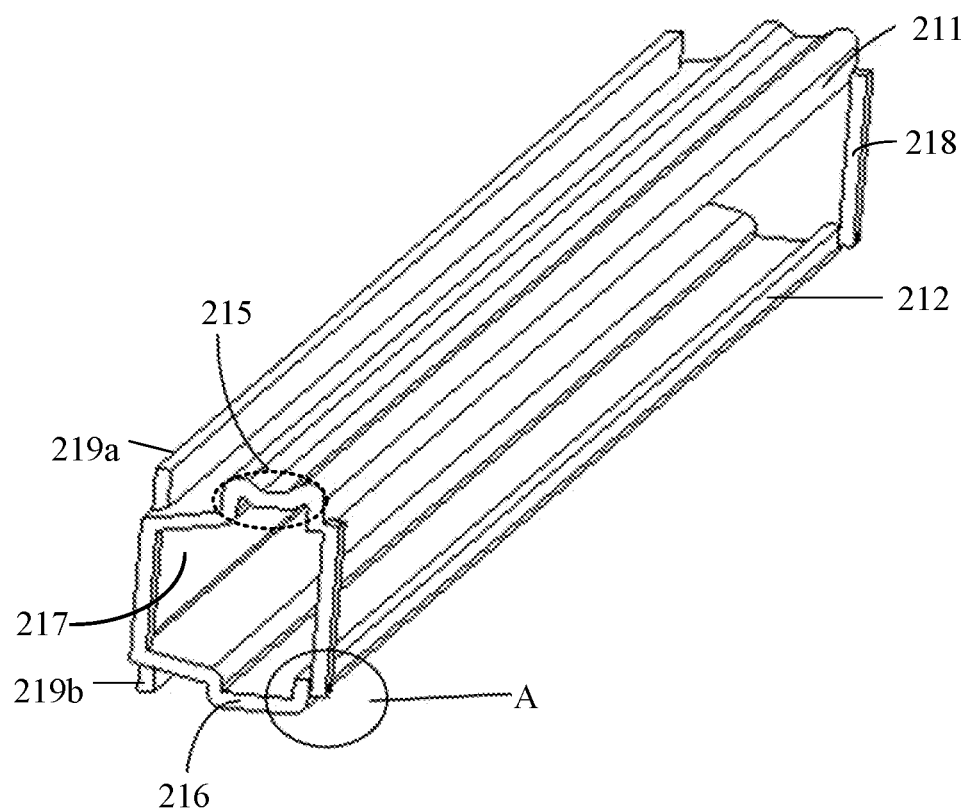

For instance, as illustrated in FIGS. 3a and 3b, an opening 217 may be formed on an end portion 219 (not illustrated in FIG. 3b) of the fixing component 21 away from the accommodating space 213 (not illustrated in FIG. 3b), and the light source (not illustrated in FIGS. 3a and 3b) is disposed at the opening 217. Thus, the light source and the wavelength converter can be more compactly assembled together, so as to improve the optical coupling property of the wavelength converter.

For instance, as illustrated in FIGS. 3a and 3b, the end portion 219 of the fixing component 21 may include a first extension 219a and a second extension 219b which are extended towards the direction away from the opening 217; and the extending directions of the second extension 219b and the first extension 219a are on a same line. As illustrated in FIG. 1, by means of the first and second extensions (not illustrated in FIG. 1), the wavelength converter 20 can be stably disposed on the circuit board 12 of the light source 10, which facilitates improving the mechanical performance of the backlight.

For instance, the side wall 210 of the fixing component 21 may include a first housing 211 and a second housing 212 opposite to each other, so as to form an accommodating space 213. By utilizing the first housing 211 and the second housing 212, the structure of the fixing component 21 is simplified and the wavelength converter can be conveniently disposed in the accommodating space 213 of the fixing component 21. For instance, opposite acting forces may be applied to end portions of the first housing 211 and the second housing 212 closer to the accommodating space 213, respectively, so as to increase the distance between the first housing and the second housing; subsequently, the wavelength conversion component may be placed into the accommodating space 213 between the first housing and the second housing; and finally, the end portions of the first housing 211 and the second housing 212 may be connected by a connecting part 218 (as illustrated in FIG. 3b), so that the wavelength conversion component can be fixed between the first housing 211 and the second housing 212.

Figure 3C:
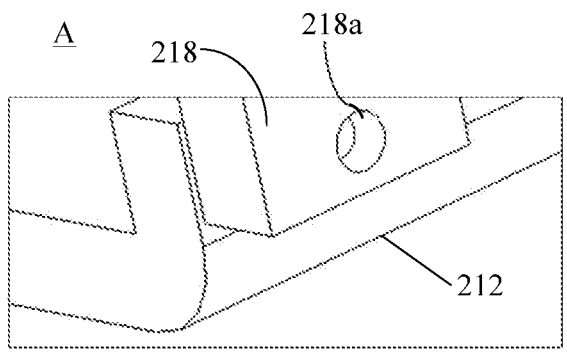
FIG. 3c is a schematic partial enlarged view of an area "A" in FIG. 3b.

For instance, as illustrated in FIG. 3c, the connecting part 218 may be provided with a positioning hole 218a; and the connecting part 218 may be fixed with the housing (FIG. 3c illustrates the second housing 212 by way of example) included in the fixing component 21 by arrangement of a structure such as a bolt or a positioning pin in the positioning hole 218a. Of course, the means for fixing the connecting part 218 and the housing includes but not limited to those illustrated in FIG. 3c.

At least one embodiment of the present disclosure further provides a display device including the backlight provided by any foregoing embodiments.

Figure 4:
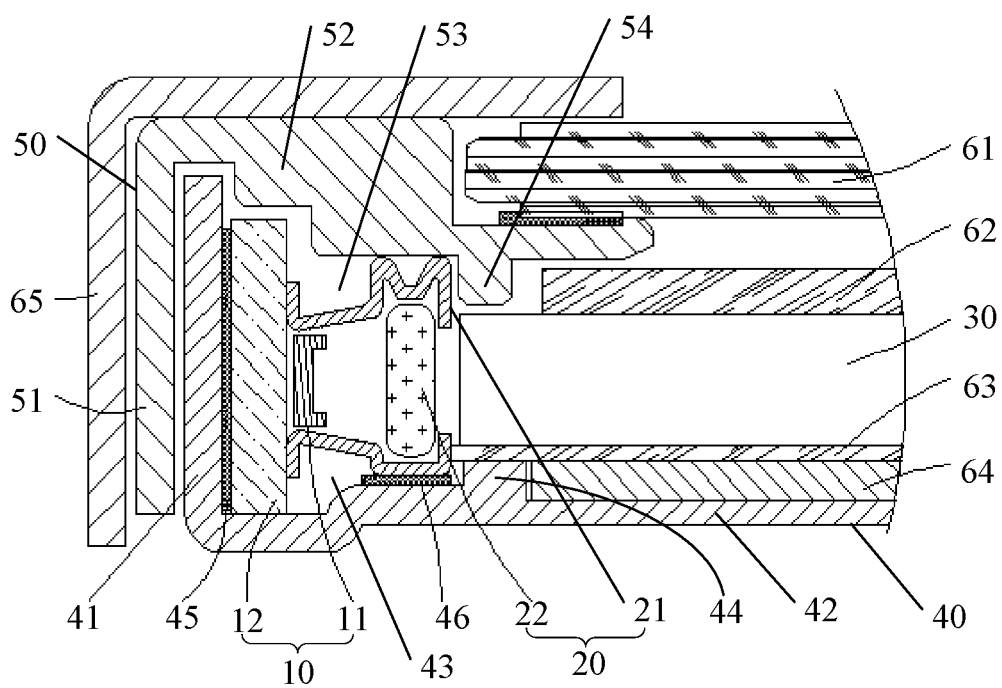
FIG. 4 is a schematic partial sectional view of a display device provided by an embodiment of the present disclosure.

For instance, as illustrated in FIG. 4, the display device provided by at least one embodiment of the present disclosure includes a display panel 61 disposed on the backlight (not illustrated in FIG. 4). In the display process, the backlight provides backlight for the display panel 61. For instance, the display panel 61 may be a LCD panel or a passive display panel.

For instance, the display device provided by at least one embodiment of the present disclosure may further include a front frame 65 to fix the backlight with the display panel 61. Of course, the display device may further include other common structures. No further description will be given herein.

For instance, the display device provided by the embodiment of the present disclosure may be any product or component with display function such as a mobile phone, a tablet PC, a TV, a display, a notebook computer, a digital picture frame and a navigator.

At least one embodiment of the present disclosure further provides an assembly method of a backlight. Taking the backlight illustrated in FIG. 1 as an example, the method provided by the embodiment of the present disclosure includes: as illustrated in FIG. 5a, arranging a wavelength converter 20 on a light-emitting side of a light source 10, in which the wavelength converter 20 is configured to convert light with a first wavelength into light with a second wavelength when the light passing through the wavelength converter 20, and the second wavelength is different from the first wavelength; and as illustrated in FIG. 5b, arranging a LGP 30 on one side of the wavelength converter 20 away from the light source 10, so that the LGP 30 is disposed within an irradiation range of light emitted from the wavelength converter 20.

It should be noted that the light emitted from the wavelength converter 20 may be the light with the second wavelength; of course, the light emitted from the wavelength converter 20 may also be light obtained by processing the light with the second wavelength via other optical elements in the wavelength converter.

Figure 5A:
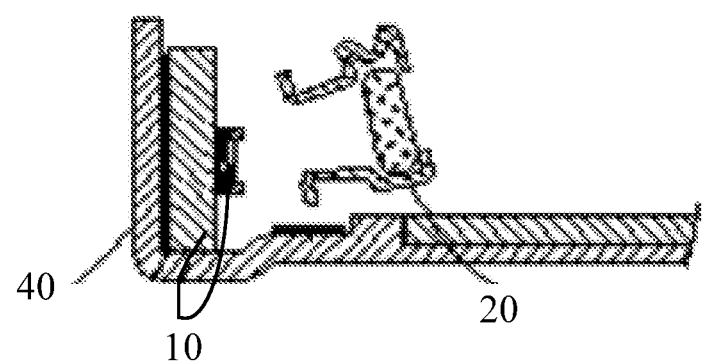
FIGS. 5a to 5c are schematic diagrams illustrating steps of an assembly method of a backlight provided by an embodiment of the present disclosure.
Figure 5B:
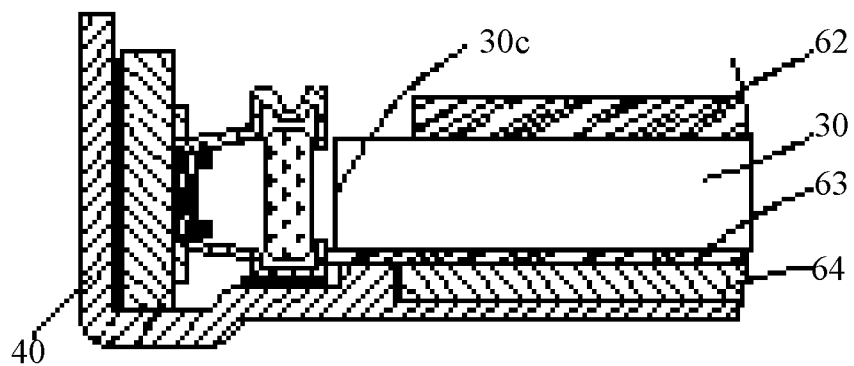

For instance, in the assembly method provided by at least one embodiment of the present disclosure, before arranging the wavelength converter 20 on the light-emitting side of the light source 10, the light source 10 may also be connected with a heat sink 40 (as illustrated in FIG. 5a). The connection between the light source 10 and the heat sink 40 may refer to the above relevant description. No further description will be given herein.

Figure 5C:
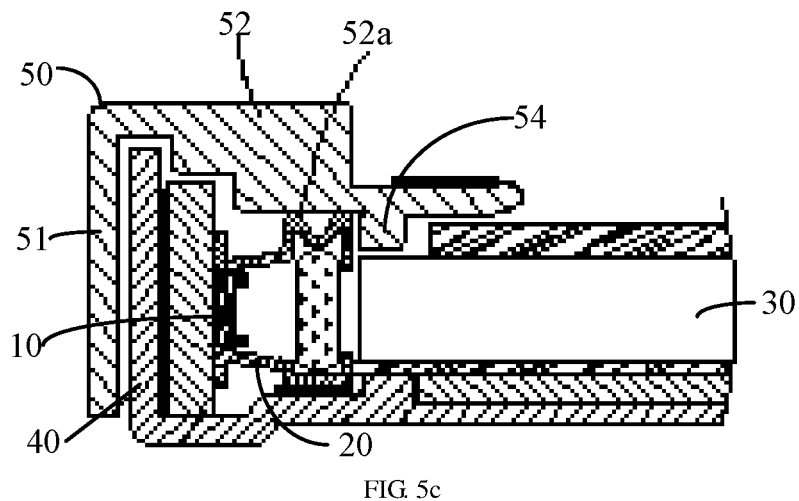

For instance, as illustrated in FIG. 5c, the assembly method provided by at least one embodiment of the present disclosure may further include: after arranging the LGP 30, placing a rubber frame 50 on the light source 10, the wavelength converter 20 and the LGP 30, so as to fix relative positions of the light source 10, the wavelength converter 20 and the LGP 30. For instance, as illustrated in FIG. 5c, the rubber frame 50 includes a baffle 51 and a positioning structure 52; the baffle 51 is disposed on one side of the light source 10 away from the wavelength converter 20; and the positioning structure 52 includes a projection 54 so as to limit the position of the wavelength converter 20. For instance, a lower surface 52a of the positioning structure 52 may also limit the position of the wavelength converter 20. Of course, the positioning structure 52 of the rubber frame 50 may be further provided with other projections (not illustrated in FIG. 5c), so as to limit the position of the light source 10 and/or the heat sink 40.

Figure 6A:
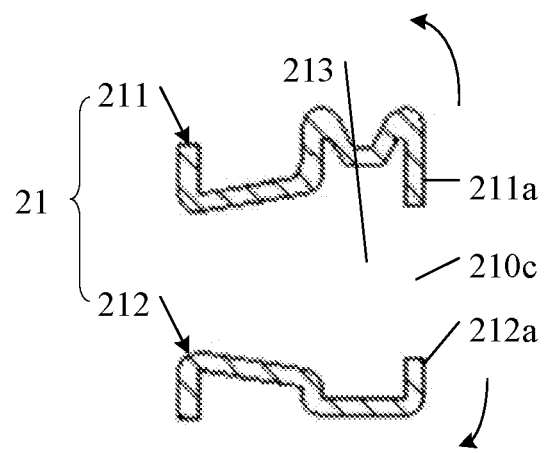
FIGS. 6a and 6b are assembly diagrams of a wavelength converter in the assembly method of the backlight provided by the embodiment of the present disclosure.
Figure 6B:
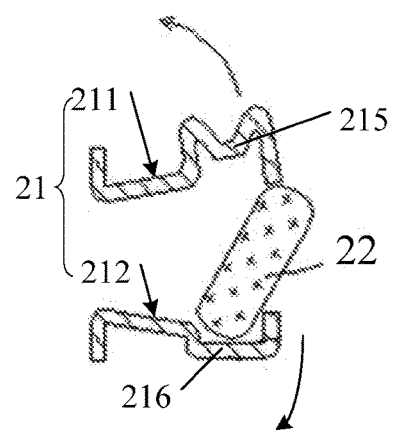

For instance, as illustrated in FIG. 1, the wavelength converter 20 may include a fixing component 21 and a wavelength conversion component 22. As illustrated in FIG. 6a, the fixing component 21 includes a first housing 211 and a second housing 212. The first housing 211 and the second housing 212 are arranged opposite to each other to form an accommodating space 213. In this case, the assembly method of the wavelength converter 20 may include: as illustrated in FIG. 6a, applying opposite acting forces (as illustrated by arrows in FIG. 6a) to end portions 211a and 212a of the first housing 211 and the second housing 212, respectively, so as to form a gap 210c between the first housing 211 and the second housing 212; and as illustrated in FIG. 6b, placing the wavelength converter 20 into the accommodating space 213 of the fixing component 21 through the gap (not illustrated in FIG. 6b).

Figure 7:
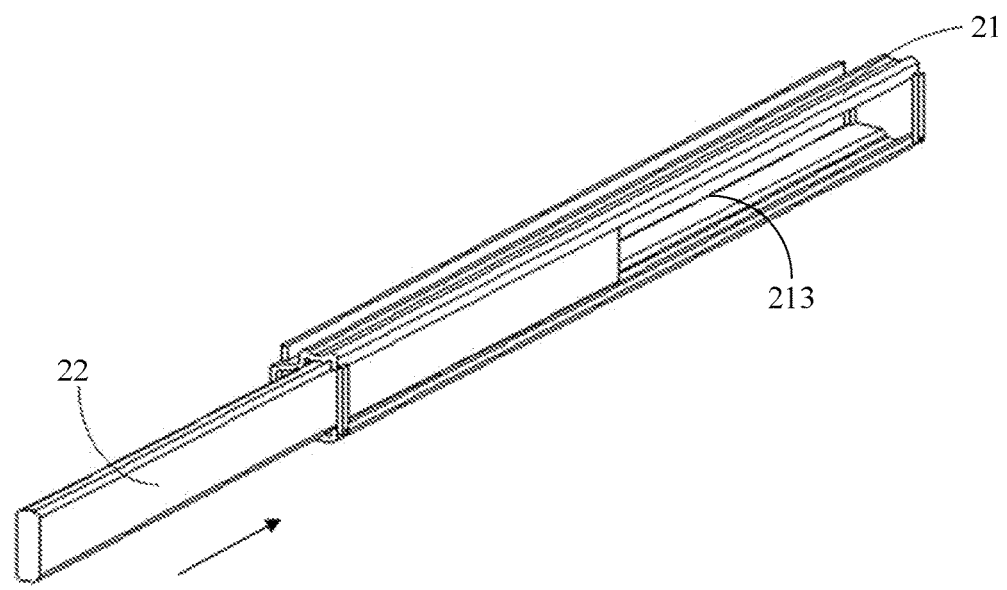
FIG. 7 is another assembly diagram of the wavelength converter in the assembly method of the backlight provided by the embodiment of the present disclosure.

Of course, the wavelength converter 20 may also be assembled by adopting other assembly methods. For instance, as illustrated in FIG. 7, the wavelength conversion component 22 may be pushed into the accommodating space 213 of the fixing component 21 along the extension direction of the fixing component 21.

The foregoing embodiments of the backlight, the assembly method thereof and the display device may refer to each other. In addition, the embodiments of the present disclosure and the characteristics described therein may be mutually combined, unless conflicted.

In summary, firstly, in the embodiments of the present disclosure, the wavelength converter is disposed between the light source and the LGP of the backlight, so that the color gamut of the display device can be increased; secondly, by adoption of the edge-lit structure, the embodiment of the present disclosure has the advantages of simpler structure and convenient assembly; thirdly, the design of the structures such as the fixing component, the heat sink and the rubber frame of the wavelength converter can improve the mechanical performance of the backlight provided by the embodiment of the present disclosure; and fourthly, in some embodiments, the reflection cavity is formed by the fixing component of the wavelength converter, so the optical coupling property of the wavelength converter can be improved.

Obviously, various modifications and deformations can be made to the present disclosure by those skilled in the art without departing from the spirit and scope of the present disclosure. Therefore, the present disclosure is intended to include the modifications and deformations fallen within the scope of the appended claims and equivalents thereof.

The present application claims the benefits of Chinese patent application No. 201610326436.9 filed with the SIPO on May 17, 2016, which is incorporated herein by reference as part of the application.

What is claimed is:

1. A backlight, comprising:
   a light source configured to emit light having a first wavelength;
   a wavelength converter disposed on a light-emitting side of the light source and configured to convert the light having the first wavelength into light having a second wavelength upon passing through the wavelength converter, the second wavelength being different from the first wavelength; and
   a light guide plate (LGP) disposed on one side of the wavelength converter away from the light source, and configured to receive and re-emit the light emitted from the wavelength converter,
   wherein the wavelength converter comprises:
      a wavelength conversion component configured to convert the light having the first wavelength into the light having the second wavelength; and
      a fixing component including a side wall for providing an accommodating space, wherein the wavelength conversion component is disposed in the accommodating space of the fixing component,
   wherein the side wall of the fixing component includes a first protrusion, a second protrusion, and a third protrusion which are protruded towards the wavelength conversion component, the wavelength conversion component is disposed between the first protrusion and the second protrusion,
   wherein the first protrusion, the second protrusion, and the third protrusion are all disposed on a first side of the wavelength conversion component, and wherein the third protrusion is disposed between the first protrusion and the second protrusion.

2. The backlight according to claim 1, wherein
   the LGP includes a light-emitting surface and a reflecting surface opposite to each other, and further includes a light-incident surface connecting the light-emitting surface and the reflecting surface; and
   the wavelength converter is disposed between the light source and the light-incident surface of the LGP.

3. The backlight according to claim 1, wherein
   the side wall of the fixing component further includes a fourth protrusion and a fifth protrusion which are protruded towards the wavelength conversion component;
   the fourth protrusion and the fifth protrusion are disposed on a second side of the wavelength conversion component; and the second side of the wavelength conversion component is opposite to the first side of the wavelength conversion component.

4. The backlight according to claim 1, wherein
   the side wall of the fixing component forms a reflection cavity located between the light source and the wavelength conversion component; and the side wall of the fixing component is provided with a reflecting surface at the reflection cavity.

5. The backlight according to claim 4, wherein the reflecting surface is inclined relative to the light-emitting side of the light source.

6. The backlight according to claim 4, wherein, in a direction from the reflection cavity to the accommodating space of the fixing component, an aperture of the reflection cavity is gradually increased.

7. The backlight according to claim 1, wherein an opening is formed on an end portion of the fixing component; and the light source is disposed at the opening.

8. The backlight according to claim 1, wherein the side wall of the fixing component includes a first housing and a second housing opposite to each other, so as to form the accommodating space of the fixing component.

9. The backlight according to claim 1, wherein the wavelength conversion component includes a luminescent material.

10. The backlight according to claim 1, further comprising a heat sink, wherein
the heat sink includes a baffle and a bearing board connected with the baffle; an accommodating space is formed between the baffle and the bearing board; and
the light source, the wavelength converter and the LGP are disposed in the accommodating space of the heat sink.

11. The backlight according to claim 10, wherein the bearing board of the heat sink includes a lug boss protruded towards the LGP; and the lug boss is disposed on one side of the wavelength converter away from the light source, so as to limit a position of the wavelength converter.

12. The backlight according to claim 1, further comprising a rubber frame, wherein
the rubber frame comprises a baffle and a positioning structure connected with the baffle; an accommodating space is formed between the baffle and the positioning structure; and the light source and the wavelength converter are disposed in the accommodating space of the rubber frame.

13. The backlight according to claim 12, wherein the positioning structure of the rubber frame is provided with a projection; and the projection is disposed on one side of the wavelength converter away from the light source, so as to limit a position of the wavelength converter.

14. A display device, comprising a backlight, the backlight comprising:
a light source configured to emit light having a first wavelength;
a wavelength converter disposed on a light-emitting side of the light source and configured to convert the light having the first wavelength into light having a second wavelength upon passing through the wavelength converter, in which the second wavelength is different from the first wavelength; and
a light guide plate (LGP) disposed on one side of the wavelength converter away from the light source, and configured to receive and re-emit the light emitted from the wavelength converter,
wherein the wavelength converter comprises:
a wavelength conversion component configured to convert the light having the first wavelength into the light having the second wavelength; and
a fixing component including a side wall for providing an accommodating space, wherein the wavelength conversion component is disposed in the accommodating space of the fixing component,
wherein the side wall of the fixing component includes a first protrusion, a second protrusion, and a third protrusion which are protruded towards the wavelength conversion component, the wavelength conversion component is disposed between the first protrusion and the second protrusion,
wherein the first protrusion, the second protrusion, and the third protrusion are all disposed on a first side of the wavelength conversion component, and wherein the third protrusion is disposed between the first protrusion and the second protrusion.

15. An assembly method of a backlight, comprising:
arranging a wavelength converter on a light-emitting side of a light source, the wavelength converter being configured to convert light having a first wavelength into light having a second wavelength upon the light passing through the wavelength converter, the second wavelength being different from the first wavelength; and
arranging a light guide plate (LGP) on one side of the wavelength converter away from the light source so that the LGP is disposed within an irradiation range of light emitted from the wavelength converter,
wherein the wavelength converter comprises:
a wavelength conversion component configured to convert the light having the first wavelength into the light having the second wavelength; and
a fixing component including a side wall for providing an accommodating space, wherein the wavelength conversion component is disposed in the accommodating space of the fixing component,
wherein the side wall of the fixing component includes a first protrusion, a second protrusion, and a third protrusion which are protruded towards the wavelength conversion component, the wavelength conversion component is disposed between the first protrusion and the second protrusion,
wherein the first protrusion, the second protrusion, and the third protrusion are all disposed on a first side of the wavelength conversion component, and wherein the third protrusion is disposed between the first protrusion and the second protrusion.

16. The assembly method according to claim 15, wherein the fixing component includes a first housing and a second housing which are arranged opposite to each other to form the accommodating space;
wherein an assembly method of the wavelength converter comprises:
applying opposite acting forces to end portions of the first housing and the second housing in the fixing component of the wavelength converter, respectively, so as to form a gap between the first housing and the second housing; and
placing the wavelength conversion component in the accommodating space of the fixing component through the gap.

17. The assembly method according to claim 15, further comprising:
placing a rubber frame on the light source, the wavelength converter, and the LGP, so as to fix relative positions of the light source, the wavelength converter, and the LGP.

* * * * *